(No Model.)
S. W. WOODLAN.
DISK HARROW.
No. 564,133. Patented July 14, 1896.
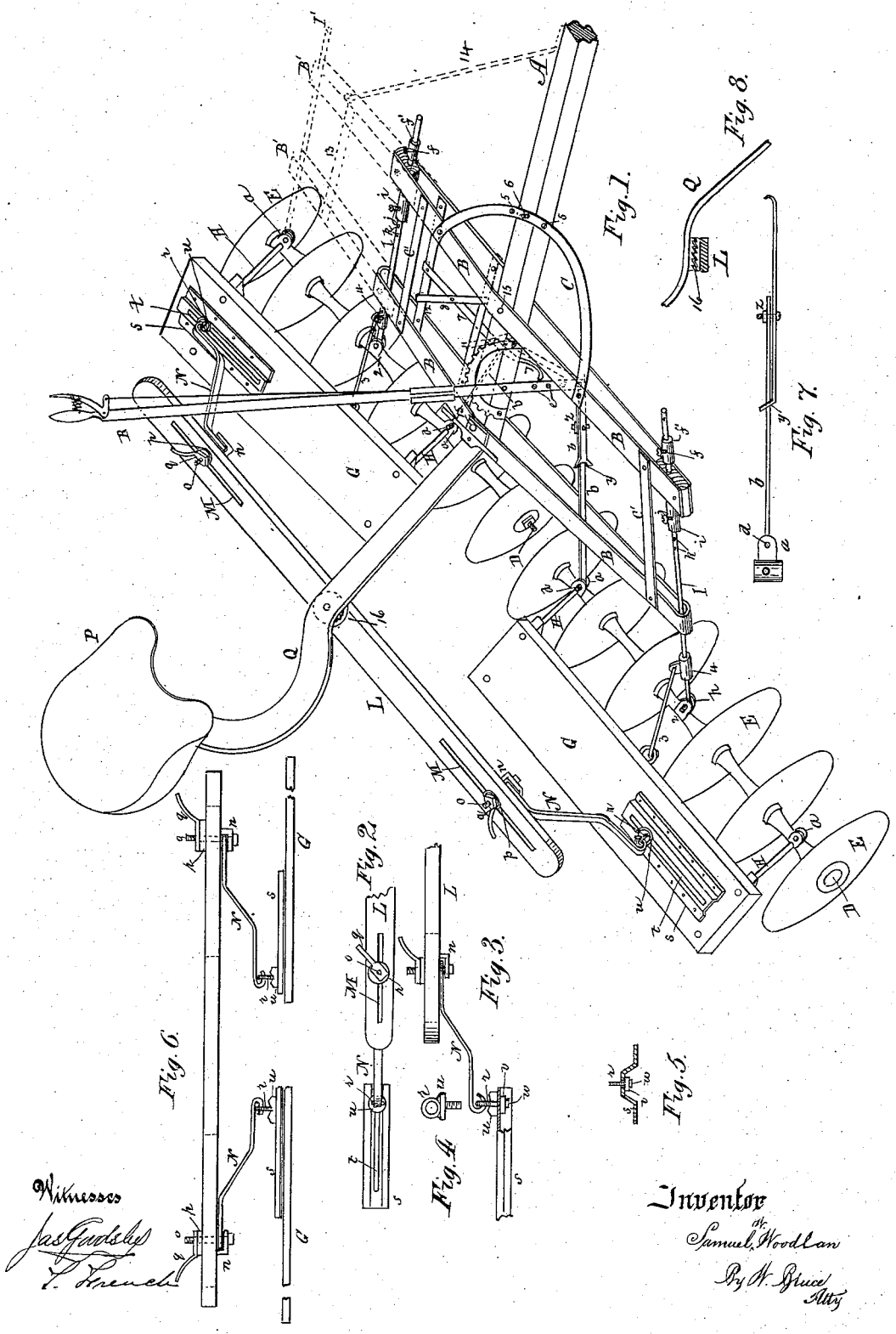

UNITED STATES PATENT OFFICE.

SAMUEL W. WOODLAN, OF SMITHVILLE, CANADA, ASSIGNOR OF ONE-HALF TO ROLLAND CLARK PATTERSON, OF SAME PLACE.

DISK HARROW.

SPECIFICATION forming part of Letters Patent No. 564,133, dated July 14, 1896.

Application filed April 15, 1896. Serial No. 545,761. (No model.)

*To all whom it may concern:*

Be it known that I, SAMUEL W. WOODLAN, a citizen of the Dominion of Canada, residing at Smithville, in the county of Lincoln, in the Province of Ontario, Canada, have invented certain new and useful Improvements in Disk Harrows; and I do hereby declare that the following is a full, clear, and exact description of the same.
The invention relates to certain improvements in disk harrows which will possess the following advantages: First, balancing the weight of the driver on each half of the disks to cause them to run on all kinds of soils.
Second, the disks can be quickly reversed, so as to throw the soil either outward or inward to the center. Third, the disks are arranged and constructed in such a manner as to run all in a line or one behind the other. Fourth, the construction of the parts renders the driver's seat comfortable and easy, and at the same time lower than is usual on disk harrows. The regulating-lever is also very convenient to the driver's seat, so that it is no trouble for him to operate it when necessary. Fifth, the group of disks are drawn from the center instead of the ends, as is usual with the present make of disk harrows, rendering it more easy of adjustment to reverse the disks for cutting inward or outward. Sixth, a reversible extension of one side of the frame to widen the machine for the purpose of cultivating the ground under fruit-trees, vineyards, &c., while the horses and harrow are in the center between the rows, which prevents the whiffletrees from striking and injuring the trees, and also prevents the horses from breaking off leaves and branches, as is always more or less done in the ordinary manner of cultivating between rows of fruit-trees. Seventh, forming a steel movable truss-frame (instead of a rigid wood frame) which can be adjusted and held by a half-circular brace, the ends of which are secured to the forward part of the truss-frame and the central circular portion to the tongue by a bolt passing through the tongue and one of the adjusting-holes in the said half-circular brace, the object of which is to admit one-half of the disk cutters to be placed behind the other for cutting or cultivating all the soil that is usually left uncultivated between the halves of the harrows. In doing this the draw-bar is changed from the outside end of the extension-frame to the outer end of the main frame. Eighth, a clutch-plate will be fastened to the under side of the seat-spring bar, and the spring-bar will be pivoted to the other two parts, so that the said spring-bar can be turned on a pivot to allow the bar to suit the position of the disks, more especially when one half of the disks are in rear of the other. I attain these objects by the mechanism illustrated in the accompanying drawings, in which—

Figure 1 is a perspective view of my disk harrow. Fig. 2 is a top view of part of the spring-bar and spring. Fig. 3 is a side view of the same. Fig. 4 is a side view of eyebolt and circular casting. Fig. 5 is a cross-section of slotted plate. Fig. 6 is a side view of spring-bar, springs, and top planks. Fig. 7 is a top view of adjustable connecting-rods. Fig. 8 is a detached view of clutch-plate fastened to the under side of a seat-spring.

A represents the tongue.

B B is the steel truss-frame, pivotally secured to the tongue by pins or bolts 15.

C is a half-circular brace, secured at each end to the forward truss B, and to the tongue A by a bolt 6, passing through one of the holes 5, so as to adjust one set of cutters or disks slightly in rear of the other.

C C are top brace-rods securing the ends of the truss-frame together.

D D are the disk-shafts, upon which are secured the disks E, formed convex on one side and concave on the other, and are secured on their respective spindles in two groups of six each.

G G are top planks bolted to the top of the journal-stands H H at the outer ends of the disks E, the said journal-stands being T-shaped, the lower ends formed circular and having a hole through which passes the shafts D D. The front side of the bottom of the said journal-stands are provided each with two lugs *a*, having a pin-hole to afford an easy means of securing the ends of the connecting-rods *b b*, which are adjustable in sections and made to pass from two pairs of lugs *a* to the lower portion of the hand-lever R, a pin *d* passing through the ends of the said rods and also through the lugs, and the opposite ends of said rods *b b* are bent and let into holes *e* (of which there are three or four) in the lower end of the said lever R, so as to set the two groups of disks E at any angle for cutting by simply moving the handle of said lever R backward or forward, as the case may be.

I I are two wrought-iron draw-bars, each being secured at one end to the truss-frame B by a pin *f*, passing through each draw-bar, and a collar *f* on each, and the rear ends of said bars inserted between the lugs *h* of the collar 2 on the shafts D D, which admits of sufficient movement of the disks E to allow them to adapt themselves to the unevenness of the ground when in actual operation.

*i i* are movable collars placed on the draw-bars I I and each tightened with its set-screw *j* to hold with the braces 3 3 the top planks G G in place with the spring-bar L, while the lever R holds the draw-bars and disks in position at any desired angle for cutting in or out, and to alter the angle of the draw-bars and disks, the pin *f* at each end of the cross-bars B can be removed and inserted into another of the holes *k* in the draw-bars I I, when the said draw-bars are pushed far enough through the truss-frame, the collars *i i* being previously moved rearward on the draw-bars. By removing the pins *f f* and unhooking the rods *b b* from the lower part of the lever R the two said draw-bars I I can be drawn out of the truss-frame and the disk-sections reversed for harrowing ground outward from the center.

3 3 are short brace-rods connecting the top planks G G to adjustable collars 4 on the draw-bars I I, the rods being hooked into a perforated lug 4 on the said collars.

L is a spring-bar that carries the driver's seat P on the spring-bar Q, and is secured by adjustable flat springs N N and connecting devices to the top planks G G, as will be more fully described hereinafter, and is for the purpose of changing the weight of the driver on each section of the disks to cause them to run level with any driver (heavy or light) on all kinds of soil. This device consists as follows:

N N are flat curved springs, one end of each being secured in a casting *n* on the under side of the spring-bar, and a threaded bolt *o*, made to pass up through it, the spring N, and the slot M, a washer *p*, wider than the slot, being placed over it, and a nut *q*, (with turn-handle,) screwed on the bolt to hold the spring firm at the top and afford means to loosen the spring and change its position when required. The lower end of each spring N is bent around an eyebolt *r*, the lower part of which is screw-threaded and made to pass through a circular metal block *u*, said block being made to slide on the raised top of a longitudinal plate *s*, which is provided with a slot *t*, one plate being affixed to each of the top planks G, as shown.

The lower part of the eyebolt *r* passes through the slot *t* in the plate *s*, a washer *v* is placed over it on the under side of the raised central portion of the plate *s*, and a nut *w* screwed on the end of the eyebolt *r*. By this device the bearing of the springs N N can be shifted along the slotted plate *s*, and affixed securely in any desired spot by simply turning the nut.

Means are provided for altering the angle of the disks by a pivoted spring-lever R, working on a cogged segment attached to the tongue and connected to the disk-shafts by connecting-rods *b b*, fastened to the lugs of the journal-stands H H, each by a pin *d*, one of the said rods being longer than the other, so that one set of disks can be run a little behind the other. It will be noticed here that the said rods *b b* are in two parts, one running through a slot *y* in the other, and both held together at any length when adjusted by a screw and nut *z*. (See Figs. 1 and 7.) This prevents the inconvenience of carrying solid rods of different lengths to adjust the back disks, as heretofore had to be done, the present-mentioned method of constructing the adjusting-rods *b* serving to lengthen or shorten them instantly, as required by the operator.

B B (shown in dotted lines, Fig. 1) represent the additional end extension-frame for widening the machine for cultivating the ground under fruit-trees and vineyards, to keep the horses away from the branches, while the machine is operating in the center of the row and under the trees. They are bolted on the ends of the truss-frame B and are reversible. One of the draw-bars I is removed from its place and put through the ends of the extension-frame, as shown at I in dotted lines, Fig. 1.

When the extension-frame B is put on the left, connecting-rod *b* is detached from the lever R and secured to the inner leg 7 of an X-shaped lever 8, which is pivoted at two ends to cross-braces 11 and 12, and the two parts of the said lever 8 are pivoted together in the center. The inner leg of the said lever is operated by the adjusting hand-lever R, a link connecting them together, and the result is that by the operator pressing the hand-lever R forward the inner end of the left disk is thrown backward to cut at any desired angle.

It will be seen that when the extension-frame is added it will be strengthened by a cross-piece 13, connecting them together near their outer ends, and also a brace 14, connecting the front one with the tongue A, as shown in dotted lines, Fig. 1.

It will further be observed that each of my groups of disks swivel from the center, that being the point where the draw-bars are pivoted to allow them to operate at different angles.

I shorten one of the draw-bars I when the harrow is desired to throw the ground outward by shifting the outward pin f to an inner hole k, pushing the collar i backward sufficiently to allow it, and also shift the adjustable connecting-rod 3 on the same side by adjusting its collar 4. The springs N N are shifted to the inside when the disks are reversed so as to make them point in the opposite way, as seen in Fig. 6, to place the weight of the driver on the inner end of the groups of disks E.

There will be fastened to the under side of the seat-spring bar Q a clutch-plate 16 in two parts, where it passes over the spring-bar L, the parts being pivoted together so that the said spring-bar L can be turned on a pivot to suit the position of the disks, more especially when one half of the disks is in rear of the other.

What I claim as my invention, and desire to secure by Letters Patent, is—

1. In combination with two disk-harrow shafts independently pivoted for varying inclinations, a draft-pole, a rigid metallic truss-frame having the form of a single rectangle pivoted as a whole to said pole and draw-rods extending from the ends of the said truss-frame to the middle parts of the said shafts respectively, substantially as set forth.

2. In a disk harrow, the combination of the truss-frame B, B, and draw-bars I, I, passing through the truss-frame, and made adjustable by collars and pins, substantially as and for the purpose specified.

3. In a disk harrow, the combination with disks and their shafts, of the collars 2 having lugs h placed in the center of the shafts D, D, draw-rods I, I, attached to said collars 2, collars 4 and i, i, on the said draw-rods, and brace-rods 3, 3, connecting the collars 4 to the top plank G, substantially as and for the purpose specified.

4. In combination with the seat, seat-bar and frame of a harrow a spring-bar L secured to said seat-bar and longitudinally slotted near its ends, the top boards G of each set of disks provided with slots corresponding to those in the said spring-bar, and springs connecting the said spring-bar to the said top boards by means of the said slots and clamping devices adjustable therein, substantially as and for the purposes set forth.

5. In a disk harrow, in combination with the spring-bar L, having slots M, of the springs N, N, adjustably secured to the bar L and to the top planks G, G, substantially as and for the purpose specified.

6. The slotted metal plate s attached to and in combination with the top planks G, G, and devices at both ends, of the springs N, N, to enable them to be moved on the top planks G, G, and also on the spring-bar L, to be secured at any desired point, substantially as and for the purpose specified.

7. The combination of the top planks G, G, slotted metal plates s, s, springs N, N, plates n, n, eyebolts r, r, circular blocks u, u, bolts o, o, washers p, p, and nuts q, q, for adjustably reversing and securing the springs, substantially as specified.

8. In a disk harrow, the combination with the truss-frame B, B, disks and draw-bars, of the extension-frame B, B, with braces, and the removable draw-rods I adapted to be attached either to the frame B or the supplemental frame B' as needed for widening the machine for cultivating between rows of fruit-trees, substantially as specified.

9. The combination with the extension-frame B, B, truss-frame B and operating-lever R, of the X-shaped lever 8, substantially as and for the purpose specified.

Dated at Smithville, Ontario, this 28th day of February, 1895.

SAMUEL W. WOODLAN.

In presence of—
 EDWARD IRVINE,
 J. A. SCHNICK.